United States Patent
Kim

(10) Patent No.: US 7,068,714 B2
(45) Date of Patent: Jun. 27, 2006

(54) ERROR CONTROL APPARATUS AND METHOD FOR CHANNEL EQUALIZER

(75) Inventor: Gang-Ho Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 810 days.

(21) Appl. No.: 09/780,380

(22) Filed: Feb. 12, 2001

(65) Prior Publication Data

US 2001/0016003 A1     Aug. 23, 2001

(30) Foreign Application Priority Data

Feb. 12, 2000     (KR) .................. 2000-6665

(51) Int. Cl.
*H03H 7/30*     (2006.01)

(52) U.S. Cl. .................. 375/233; 375/234; 375/235
(58) Field of Classification Search .............. 375/232, 375/350, 229, 231, 233, 250, 234; 708/323; 333/18, 28 R See application file for complete search history.

(56) References Cited

U.S. PATENT DOCUMENTS

| | | | | |
|---|---|---|---|---|
| 5,692,011 A * | 11/1997 | Nobakht et al. | ............ | 375/233 |
| 5,956,328 A * | 9/1999 | Sato | ............ | 370/335 |
| 6,188,722 B1 * | 2/2001 | Velez et al. | ............ | 375/233 |
| 6,421,378 B1 * | 7/2002 | Fukuoka et al. | ............ | 375/229 |
| 6,426,680 B1 * | 7/2002 | Duncan et al. | ............ | 331/34 |
| 6,426,972 B1 * | 7/2002 | Endres et al. | ............ | 375/229 |
| 6,496,229 B1 * | 12/2002 | Limberg | ............ | 348/725 |
| 6,505,222 B1 * | 1/2003 | Davis et al. | ............ | 708/323 |
| RE38,456 E * | 3/2004 | Patel et al. | ............ | 348/726 |

* cited by examiner

*Primary Examiner*—Jean Corrielus
*Assistant Examiner*—Qutub Ghulamali
(74) *Attorney, Agent, or Firm*—Birch, Stewart, Kolasch & Birch, LLP

(57) ABSTRACT

A channel equalizer includes an equalizer filter for correcting an error upon receipt of a signal transmitted by a sending end, a DD slicer for calculating a first error upon receipt of the corrected signal from the equalizer filter, a Sato slicer for calculating a second error upon receipt of the corrected signal from the equalizer filter, and a DD error size calculation unit for taking the absolute value of the real part and imaginary part of the first error calculated from the DD slicer and summing these absolute values.

11 Claims, 2 Drawing Sheets

ERROR CONTROL APPARATUS AND METHOD FOR CHANNEL EQUALIZER

BACKGROUND OF THE INVENTION

1. Field of the Invention

The present invention relates to an error control method for a digital channel equalizer, and more particularly, to an error control method for a channel equalizer which is capable of improving complexity and error update speed by decreasing the number of gates of a Decision-Directed (DD) error size calculation unit of a combined G-pseudo channel equalizer among digital channel equalizers.

2. Description of the Background Art

Generally, a channel equalizer is an apparatus for decreasing bit detection error by compensating for a restricted bandwidth of a plurality of filters used in a sending/receiving end and a distortion generated while a signal passes through multiple paths of a transmission channel, when a digital transmission system such as a HDTV sends/receives a signal.

If the signal transmitted from the sending end is distorted, contains noise, and has a higher signal level, the error generation rate is increased. Thus, the receiving end utilizes a channel equalizer in order to accurately restore a transmitted signal by compensating for the distortion of a received signal.

The operation of the channel equalizer is divided into an acquisition step of acquiring a signal close to the original signal by reducing error until a distorted, received signal is compensated to be close to the original signal, and a tracking step of configuring the signal whose error is reduced until it becomes close to the original signal so that it meets changes in channel well. Even after the received signal is compensated for, if the signal sent from the sending end is seriously distorted, there occurs a problem that the equalizer diverges. This problem can be overcome by inserting a predetermined training sequence signal into the signal transmitted from the sending end to the receiving end and transmitting the same.

When the training sequence signal is inserted into the transmission signal, the bandwidth of a signal to be transmitted is reduced since the training sequence signal is a signal for correcting an error, and the complexity of the sending end system is increased since an apparatus for generating the training sequence must be added to the sending end system.

Therefore, a blind channel equalizer such as a combined G-pseudo channel equalizer which has an excellent convergence characteristic even if the training sequence signal is not inserted, has been researched and developed.

The combined G-pseudo channel equalizer is an equalizer combining an equalizer utilizing a DD algorithm and an equalizer utilizing a Sato algorithm, each having a DD slicer and a Sato slicer. In the case that a signal received by the G-pseudo channel equalizer is updated by a DD error only, the equalizer is easy to diverge. Thus, convergence is performed by using both DD error and Sato error. In addition, in the case that an error of a signal received by using a Sato error only is updated, there remains a lot of residual errors even after the final convergence. Thus, errors can be reduced by performing convergence using a DD error at the point of time where the convergence is performed to a certain extent.

In the case that a transmission signal to which the training sequence signal is not inserted is inputted, the DD error is an error detected by estimating an approximate value of the original signal from the above input signal, whereas the Sato error is an error detected from the original signal by the mean power of the inputted signal.

FIG. 1 is a block diagram of a combined G-pseudo channel equalizer according to the conventional art, which includes an equalizer filter 10 for correcting an error of received data; a DD(Decision-Directed) slicer for generating a DD error upon receipt of a correction signal outputted from the equalizer filter 10; a DD error size calculation unit 40 for calculating the size of the outputted DD error; a Sato slicer unit 50 for calculating the Sato error upon receipt of the correction signal outputted from the equalizer filter 10; multipliers 30, 60, 70; and an adder 80.

The operation of the thusly constructed combined G-pseudo channel equalizer will be described with reference to FIGS. 1 and 2.

If the signal sent from the sending end is inputted to the channel equalizer via a channel without the training sequence signal, the channel equalizer obtains the optimum value of an inverse response of the channel, this optimum value generating the original signal transmitted from the sending end by multiplying the original signal and the response value of the channel at the output end of the channel equalizer.

The mathematical formula for obtaining the above-described transmitted original signal will be expressed as follows.

$$a \cdot s \cdot s^{-1} = a \qquad (1)$$

a is the original signal.

s is the response value of the channel.

$s^{-1}$ is the optimum value of the inverse response of the channel.

If the signal a is inputted to the equalizer filter 10, the optimum value of the inverse response ($s^{-1}$) of the channel is outputted by correcting an error of the received signal by the equalizer filter 10. The outputted signal is obtained by correcting an error by the DD slicer unit 20 and the Sato slicer unit 50.

In the DD slicer unit 20, a DD silcer 21 performs calculation on the inputted signal to output the most approximate value of the original signal, and an abstractor 22 abstracts the value outputted from the equalizer filter 10 from the outputted approximate value to thus generates a DD error. The generated DD error is multiplied by a scale constant $k_1$ by the multiplier 30 to be automatically converted into the Sato error mode.

In the Sato slicer unit 50, a Sato slice 51 performs calculation on the inputted signal to output the normal value of the inputted value, and an abstractor 52 abstracts the value outputted from the equalizer filter 10 from the calculated normal value to thus generate an Sato error. The generated Sato error is multiplied by a scale constant $k_2$ by the multiplier 60 to be automatically converted into the DD error mode.

Even if the point of time where the Sato error mode and the DD error mode are converted is not set, the generated DD error and the generated Sato error are automatically converted into the Sato error mode and the DD error mode, respectively.

FIG. 2 is a graph comparing the characteristics of a general Sato error and the characteristics of a general DD error. While the DD error has a white value, i.e., a uniform value, the inverse response of the channel obtained from the combined G-pseudo channel equalizer, i.e., a G-pseudo error, is reduced by means of a Sato error. However, at point $t_1$ of time in a certain section, the Sato error becomes uniform. Since then, the G-pseudo error is reduced by means of the DD error.

The Sato error has a considerable error value even after it has converged on the optimum point, i.e., until the equalizer outputs a signal close to the optimum value of the inverse response $s^{-1}$ of the channel. Thus, if the DD error and the Sato error are added, the G-pseudo error has an error value as much as the Sato error even though the DD error has an error value of almost 0. This is the limitation on the blind method.

For this reason, if the Sato error multiplied by the scale constant is multiplied by the absolute value of the DD error calculated in the DD error size calculation unit 40, the DD error has a white value, i.e., a uniform value in the first section where the optimum value of the inverse response $s^{-1}$ is searched for, thereby not affecting the G-pseudo error. At this time, the G-pseudo error is reduced by the Sato error. However, as the Sato error becomes uniform in the section $t_1$, i.e., it converges on 0 in the section $t_1$, the G-pseudo error value is reduced by the DD error value. Thus, the optimum value of the inverse response of the channel can be searched for by means of the DD error only.

The above described coefficient updating equation and filter output equation can be expressed as follows.

$$C_{k+1} = C_k + \mu D_k^* e_k^G \qquad (2)$$

$$Y(n) = \sum D^T C \qquad (3)$$

$$e_k^G = k_1 e_k + k_2 |e_k| e_k^S \qquad (4)$$

$$|e_k| = \sqrt{e_I^2 + e_Q^2} \qquad (5)$$

$C_{k+1}$ is a coefficient of a filter tab of an equalizer of the next time.

$C_k$ is a coefficient of a filter tab of an equalizer of the current time. is the size of a step.

$D_k$ is a data stored in the filter tab of the current time.

$e_k^G$ is a G-pseudo error of the current time.

$e_k^S$ is a Sato error of the current time.

$e_k$ is a DD error of the current time.

$k_1$ and $k_2$ are scale constants.

$e_I$ is a real error.

$e_Q$ is an imaginary error.

The value obtained by multiplying the Sato error by a scale constant $k_2$ is multiplied by the value $|e_k|$ calculated in the DD error calculation unit 40, and then the resultant value $|e_k|e_k^S$ is added to the value obtained by multiplying the DD error by the scale constant $k_1$, for thereby obtaining the optimum value $s^{-1}$ of the G-pseudo equalizer.

The optimum value $s^{-1}$ obtained by the G-pseudo channel equalizer performs convergence well in most channel environments. However, since the value $|e_k|$ calculated in the DD error calculation unit 40 is the square root of the sum of a real error square and an imaginary square, i.e., $\sqrt{e_I^2+e_Q^2}$, the complexity of the DD error calculation unit 40 is increased. In the case that the DD error calculation unit 40 is implemented, a large number of gates are required, for thereby increasing the size thereof and the complexity. In addition, it takes much time to obtain the square root, which degrades the performance of a receiver.

SUMMARY OF THE INVENTION

Accordingly, it is an object of the present invention to provide an error control method for a channel equalizer which reduces the number of gates needed in the equalizer by modifying the structure of a DD error size calculation unit while maintaining the performance of a combined G-pseudo channel equalizer and improves the performance of a receiver by enhancing error update speed.

It is another object of the present invention to provide a channel equalizer that overcomes the limitations and problems of the background art.

To achieve the above and other objects, there is provided a channel equalizer according to the present invention, which includes: an equalizer filter for correcting an error upon receipt of a signal transmitted by a sending end; a DD slicer for calculating a first error upon receipt of the corrected signal from the equalizer filter; a Sato slicer for calculating a second error upon receipt of the corrected signal from the equalizer filter; and a DD error size calculation unit for taking the absolute value of the real part and imaginary part of the first error calculated from the DD slicer, summing them, and then obtaining the absolute value of the error.

To achieve the above and other objects, there is provided an error control method for a channel equalizer according to the present invention, which includes the steps of: multiplying a first error calculated from a DD slicer and a second error calculated from a Sato slicer each by a scale constant; taking the absolute value of the real part and imaginary part of the first error calculated from the DD slicer, summing them, and then obtaining the absolute value of the first error; obtaining the absolute value of an inverse response signal of a channel by multiplying the absolute value of the first error by the second error multiplied by the scale constant and adding the resultant value to a first error multiplied by the scale constant; and generating a filter tab coefficient to reproduce a signal transmitted from a sending end by feeding back the absolute value of the inverse response of the channel signal to the equalizer filter.

Additional advantages, objects and features of the invention will become more apparent from the description which follows.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

The preferred embodiments of the present invention will now be described with reference to the accompanying drawings.

Figure 3:
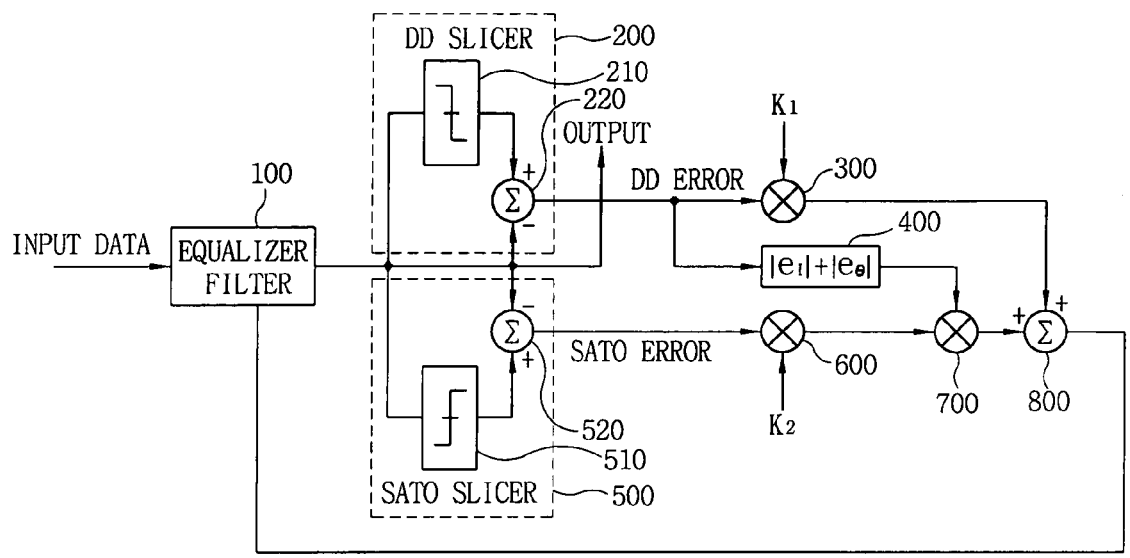
FIG. 3 is a block diagram illustrating elements of a combined G-pseudo channel equalizer according to the present invention.

FIG. 3 is a block diagram illustrating elements of a combined G-pseudo channel equalizer according to an embodiment of the present invention. The channel equalizer includes: an equalizer filter 100 for correcting an error of a received signal; a DD slicer unit 200 for generating a DD error by means of the approximate value of a signal outputted from the equalizer filter 100; a DD error size calculation unit 400 for calculating the size of the DD error; and a Sato slicer unit 500 for outputting a Sato error by means of the average value of the signal outputted from the equalizer filter.

The operation of the elements of the channel equalizer according to the invention will be explained with reference to FIGS. 2, 3, and 4.

If a signal sent from a sending end is transmitted to the combined G-pseudo channel equalizer via a channel, the equalizer calculates the optimum value of the inverse response of the channel in order to compensate the original signal. If the signal transmitted from the sending end is inputted into the equalizer filter 100, the equalizer filter 100 corrects the received signal to output the same. The outputted signal is inputted into the DD slicer 210 and the Sato slicer 510 connected with the equalizer filter 100.

The DD slicer 210 estimates the original signal from the inputted signal to thus calculate the approximate value, and an abstractor 220 abstracts the value outputted from the equalizer filter 100 from the above calculated value to thus generate a DD error. In order to automatically convert the generated DD error into the Sato error mode, a multiplier 300 multiplies the generated DD error by a scale constant $k_1$.

The Sato slicer 510 calculates the average value of the original signal from the inputted signal, and an abstractor 520 abstracts the value outputted from the equalizer filter 100 from the calculated average value to thus generate a Sato error. A multiplier 600 multiplies the generated Sato error by a scale constant $k_2$ in order to automatically convert the Sato error into the DD error mode.

Since the Sato error is larger than the DD error, it has a considerable error value even after it has converged on the optimum point. Therefore, the Sato error value multiplied by the scale constant $k_2$ is multiplied in a multiplier 700 by the absolute value of the DD error calculated from the DD error size calculation unit 400, and then the result from the multiplier 700 is added in an adder 800 to the DD error value multiplied by the scale constant $k_1$, whereby it is possible to search the optimum value of the inverse response of the equalizer. The absolute value of the DD error is obtained by taking the absolute value of the real part and imaginary part of the DD error, respectively.

The above-described G-pseudo update equation and the equation for obtaining the size of the DD error outputted from the DD error size calculation unit 400 will be expressed as follows.

$$e_k^G = k_1 e_k + k_2 |e_k| e_k^S \qquad (6)$$

$$|e_k| = |e_I| + |e_Q| \qquad (7)$$

$e_k^G$ is a G-pseudo error of the current time.
$e_k^S$ is a Sato error of the current time.
$e_k$ is a DD error of the current time.
$k_1$ and $k_2$ are scale constants.
$e_I$ is a real error.
$e_Q$ is an imaginary error.

Figure 1:
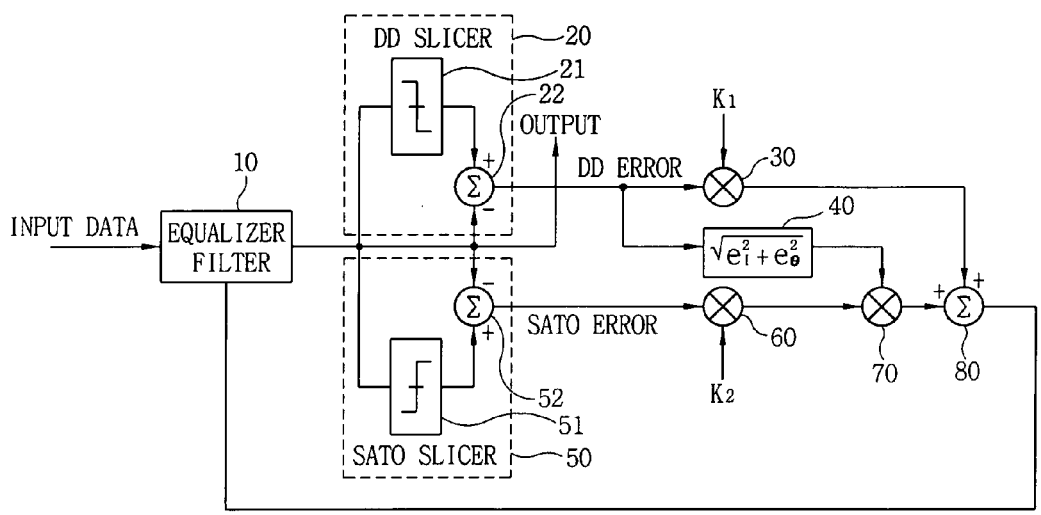
FIG. 1 is a block diagram illustrating elements of a combined G-pseudo channel equalizer according to the conventional art.
Figure 2:
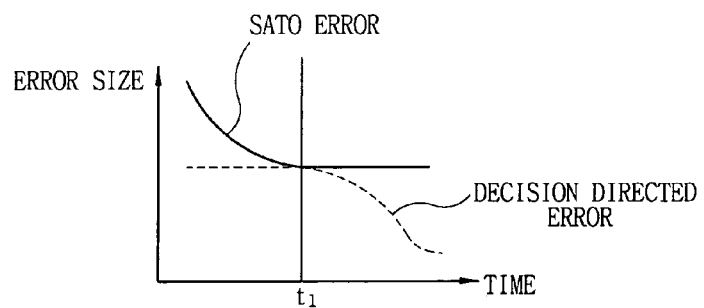
FIG. 2 is a graph comparing the characteristics of a general Sato error and DD error.

Here, the absolute value of the DD error calculated in the DD error size calculation unit 400 is a value multiplied for correcting the Sato error value as described in FIG. 2. If the Sato error value multiplied by the scale constant $k_2$ is multiplied by the absolute value of the DD error $|e_I|+|e_Q|$, the G-pseudo error is reduced by means of the Sato error only since the DD error has a white value, i.e., uniform value, before $t_1$. Since the absolute value of the DD error converges on almost 0 after $t_1$, the Sato error value converges on almost 0 by the G-pseudo update equation for thereby not affecting the G-pseudo error value. Thus, the optimum value of the inverse response of the equalizer is searched by using the DD error value only.

On the other hand, the Sato error has a higher value than the DD error all the time. Thus, although the variation value of the Sato error is small, the size of the error is larger than that of the Sato error for making error updating dependant upon the Sato error. In this case, the Sato error is multiplied by scale constants $k_1$ and $k_2$ so that the size of the first section and the size of the second section are adjusted to a similar size. The scale constants $k_1$ and $k_2$ are not predetermined values, but has to be searched by a test. In general, $k_1$ is set 3–4 times larger than $k_2$.

Figure 4:
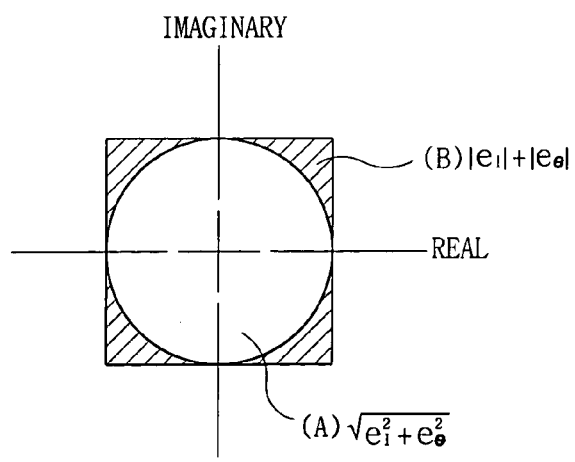
FIG. 4 is an exemplary view comparing the error distribution by means of the absolute value of a DD error according to the conventional art and the error distribution by means of the absolute value of a DD error according to the present invention.

FIG. 4 is an exemplary view comparing the error distribution by means of the absolute value of a DD error according to the conventional art and the error distribution by means of the absolute value of a DD error according to the present invention.

As illustrated in (A) of FIG. 4, the error value obtained by adding the square of the real number of the DD error and the square of the imaginary number of the DD error, and taking the square root of the added value has the same value on all points. However, as illustrated in (B) of FIG. 4, the absolute value of the real number of the DD error plus the absolute value of the imaginary number of the DD error has a different error value according to a position. In case of (B), though the error value is slightly larger than the error value of (A), it is linearly proportional to the error value of (A).

In the G-pseudo error updating equation according to the conventional art, it can be known that the DD error must not have a precise value, considering the role of the absolute value of the DD error. In other words, if the absolute value of the DD error has an equivalent value to the error value of the conventional art, although it is not identical thereto. If this absolute value is increased or decreased in linear proportion, it has the same effect of using the absolute value of the DD error taking the square root by adjusting $k_1$ and $k_2$.

Accordingly, when the DD error size calculation unit 400 takes the absolute values of the real part and imaginary part, and adds the two values, i.e., $|e_I|+|e_Q|$, it is possible to obtain the same convergence characteristics as the G-pseudo channel equalizer according to the conventional art, and implement a channel equalizer which has the characteristics of reducing operating time and complexity.

For example, if a real error and an imaginary error are 10-bits, respectively, it is possible to execute the channel equalizer only in the case that the number of gates of a block is 4960 according to the conventional art. However, the block in which the absolute value of the real error and the absolute value of the imaginary error are added according to the present invention can be implemented by only 292 gates, and it has no difference in its convergence characteristics and its residual error characteristics.

In the combined G-pseudo channel equalizer, the structure of the DD error size calculation unit is modified to thus reduce the number of gates while maintaining the performance of the G-pseudo channel equalizer and improving error update speed, whereby the complexity of the equalizer is reduced to enhance the performance of the receiver, and the size of a gate block is reduced to decrease the entire size of the receiver.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A channel equalizer comprising:
   an equalizer filter for correcting an error upon receipt of a signal transmitted by a sending end;
   a decision-directed (DD) slicer for calculating a first error upon receipt of the corrected signal from the equalizer filter;
   a Sato slicer for calculating a second error upon receipt of the corrected signal from the equalizer filter;
   a DD error size calculation unit for taking the absolute value of a real part and an imaginary part of the first error calculated from the DD slicer, and summing the absolute value of the real part and the absolute value of the imaginary part of the first error to obtain a sum;
   a first multiplier to multiple the second error output from the Sato slicer by a first scale constant; and
   a second multiplier to multiply a resultant output of the first multiplier by the sum output from the DD error size calculation unit.

2. The channel equalizer according to claim 1, further comprising:
   a third multiplier to multiply the first error output from the DD slicer by a second scale constant; and
   an adder to add a resultant output of the third multiplier to a resultant output of the second multiplier to obtain an inverse response signal of a channel.

3. The channel equalizer according to claim 2, wherein the absolute value of the inverse response signal is fed back to the equalizer filter.

4. The channel equalizer according to claim 2, wherein the second scale constant is set about 3 to 4 time larger than the first scale constant.

5. An error control method for a channel equalizer, comprising the steps of:
   generating an error corrected signal by an equalizer filter;
   multiplying a first error calculated from a decision-directed (DD) slicer and a second error calculated from a Sato slicer using the error corrected signal, by first and second scale constants, respectively;
   taking the absolute value of a real part and an imaginary part of the first error calculated from the DD slicer, and summing the absolute value of the real part and the absolute value of the imaginary part of the first error to obtain a sum;
   obtaining the absolute value of an inverse response signal of a channel by multiplying the sum by the second error multiplied by the second scale constant and adding the resultant value to the first error multiplied by the first scale constant; and
   generating a filter tap coefficient to reproduce a signal transmitted from a sending end by feeding back the absolute value of the inverse response signal of the channel to the equalizer filter.

6. The method according to claim 5, wherein the equation for obtaining the inverse response signal of the channel and the equation for generating the sum are expressed by:

$$e_k^G = k_1 e_k + k_2 |e_k| e_k^S$$
$$|e_k| = |e_I| + |e_Q|$$

where $e_k^G$ is a G-pseudo error representing the inverse response signal of the channel of a current time, $e_k$ is the first error calculated from the DD slicer of a current time, $e_K^S$ is the second error calculated from the Sato slicer of a current time, $e_I$ is the real part of the first error calculated from the DD slicer, and $e_Q$ is the imaginary part of the first error calculated from the DD slicer.

7. The method according to claim 5, wherein the size of the first error and the size of the second error are adjusted by setting the size of the first scale constant to be 3 to 4 times larger than the size of the second scale constant.

8. A channel equalizer comprising:
   first means for correcting an error upon receipt of a signal transmitted by a sending end;
   second means for calculating a decision-directed (DD) error upon receipt of the corrected signal from the first means;
   third means for calculating a Sato error upon receipt of the corrected signal from the first means;
   fourth means for taking the absolute value of a real part and an imaginary part of the DD error calculated from the second means, and summing the absolute value of the real part and the absolute value of the imaginary part of the DD error to obtain a sum;
   fifth means for multiplying the Sato error output from the third means by a first scale constant; and
   sixth means for multiplying a resultant output of the fifth means by the sum output from the fourth means.

9. The channel equalizer according to claim 8, further comprising:
   seventh means for multiplying the DD error output from the second means by a second scale constant; and
   eighth means for adding a resultant output of the seventh means to a resultant output of the sixth means to obtain an inverse response signal of a channel.

10. The channel equalizer according to claim 9, wherein the absolute value of the inverse response signal is fed back to the first means.

11. The channel equalizer according to claim 9, wherein the second scale constant is set about 3 to 4 time larger than the first scale constant.

* * * * *